United States Patent [19]
Schneeweiss

[11] 3,767,224
[45] Oct. 23, 1973

[54] REAR AXLE FOR MOTOR CARS
[75] Inventor: Manfred Schneeweiss, Ingolstadt, Germany
[73] Assignee: Audi Nsu Auto Union Aktiengesellschaft, Ingolstadt, Germany
[22] Filed: Jan. 31, 1972
[21] Appl. No.: 221,871

[52] U.S. Cl............................ 280/124 B, 267/11 R
[51] Int. Cl............................................. B60g 11/20
[58] Field of Search ................... 280/124 B, 124 R; 267/11 R

[56] References Cited
UNITED STATES PATENTS
3,615,103 10/1971 Dohring .......................... 280/124 B
3,005,642 10/1961 Hertel ............................. 280/124 B
2,631,842 3/1953 Oppenlander..................... 267/11 R FOREIGN PATENTS OR APPLICATIONS
1,013,310 12/1965 Great Britain .................. 280/124 B Primary Examiner—Philip Goodman
Attorney—Richards & Geier

[57] ABSTRACT

A rear axle for motor cars has axle ends of both wheels which are fixed to separate rigid crank arms swingably mounted in the car body. The invention is particularly characterized in that the two crank arms are connected to the car body by a torsion axle between their axle ends and their bearings; each crank arm is mounted by a bearing in the car body receiving the rotary, bending and axial movements.

7 Claims, 11 Drawing Figures

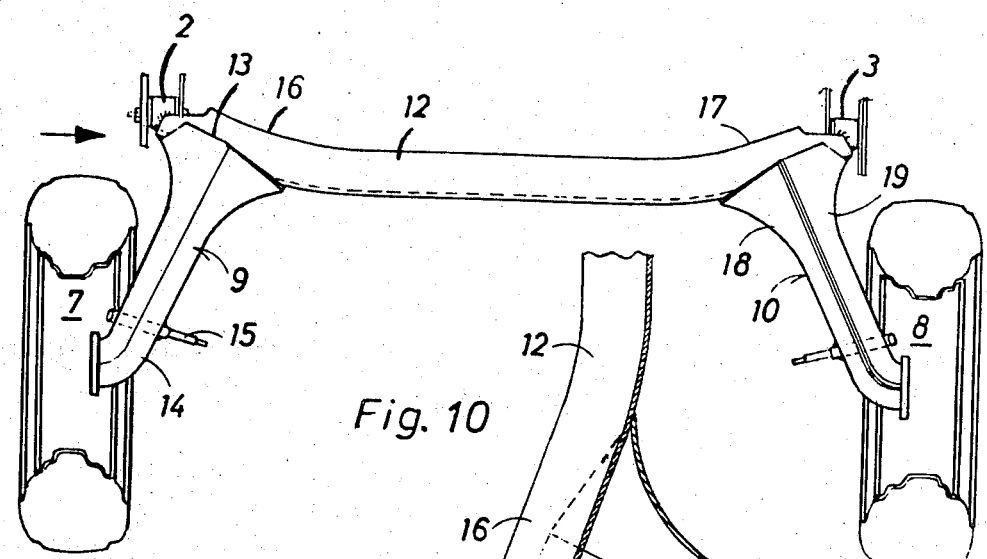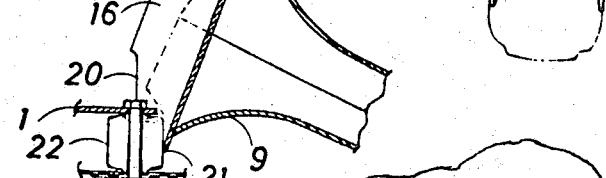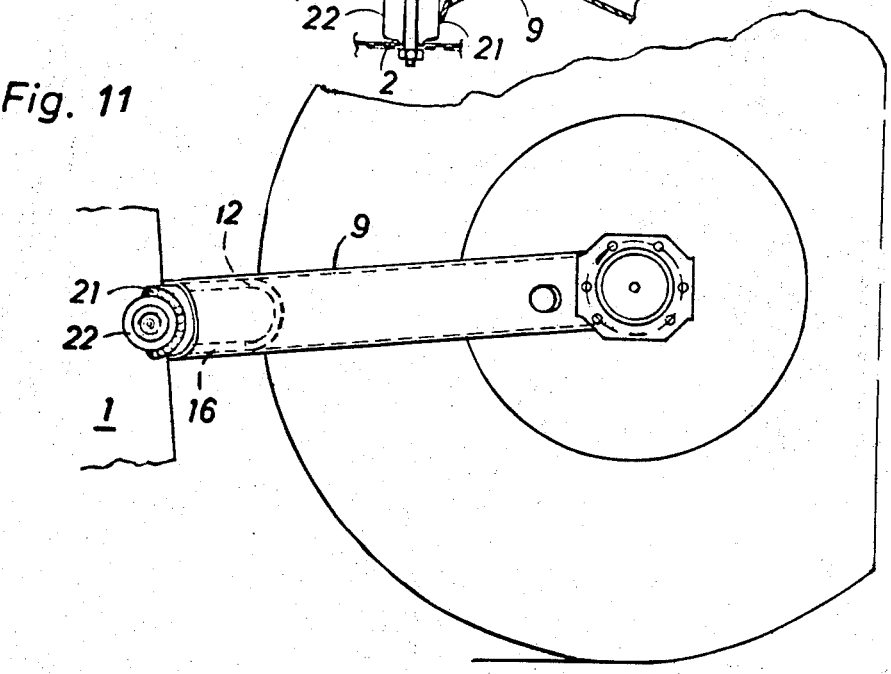

REAR AXLE FOR MOTOR CARS

This invention relates to a rear axle for motor cars wherein the axle ends of both wheels are fixed to separate rigid crank arms swingably mounted in the car body.

In a known longitudinal guide axle each crank is mounted by two bearings in a drive bolster, with their rotary axes extending transversely to the longitudinal axis of the vehicle. The track width, the dash angle and the track angle remain constant during deflection of the wheels.

In another known inclined guide axle each crank is also mounted by two bearings in a drive bolster, but their rotary axes extend at an inclination to the longitudinal axis of the vehicle. The track width, the dash angle and the track angle are varied during deflection of the wheels.

An object of the present invention is to provide a rear axle construction which will combine the advantageous features of both the longitudinal guide axle and the inclined guide axle.

Other objects of the present invention will become apparent in the course of the following specification.

In the accomplishment of the objectives of the present invention it was found desirable to connect the two crank arms by a torsion axle to the car body between their axle ends and their bearings. Each crank arm is mounted by a bearing in the car body receiving the rotary, bending and axial movements.

When the springs of the two wheels are on the same side the cranks rotate about a transverse axis formed by the two bearings. The track width, the dash angle and the track angle do not change (as is also the case with the longitudinal guide axle).

When the springs are on alternate sides the torsion axle extends at an inclination and thus determines the position of the wheels connected with it by crank arms.

When the car moves along a curve, the wheels are inclined with a considerably smaller angle as is the case in a car body with an inclined guide axle, so that the adhesion of the car to the surface upon which it is travelling is improved. Furthermore, the wheels carry out a guide movement depending upon the height of the torsion axle relatively to the bearings, so that the operating tendency of the car is influenced.

If an excessive operating tendency is desired, then the torsion axle must be arranged lower than the bearings, so that in case of springs arranged on alternate sides the wheels will swing out of the curve.

If a low operating tendency is desired the torsion axle must be arranged higher than the bearings, so that in case of springs arranged on alternate sides the wheels will swing into the curve.

If a neutral operation is desired, the torsion axle must be arranged at the same height as the bearings so that in case of springs arranged on alternate sides no swinging movement will take place.

The crank arm carrying the wheel can be fixed to the torsion axle with a large flat base. This provides a rigid connection between the torsion axle and the longitudinal guides for receiving side forces and at the same time it serves to bring the rigidity of the torsion axle and thus the inclination of the car body to a predetermined amount.

A spring base can be swingably connected to the end of the longitudinal guide which carries the wheel. Four locations of the car body which are very advantageous as far as strength is concerned, are sufficient for the fixing of the rear axle.

A particularly simple construction of the axle consists in that the torsion axle is bent at both its ends toward the bearings of the car body and the crank arms are welded to the bent ends of the torsion axle.

The crank arms are preferably composed of two plates to provide a simple inexpenisve manufacture. Furthermore, the ends of the torsion axle can be recessed and fixed to the car body by a substantially semi-circular weld joint upon the bearing ring of the bearing, thereby providing a simple connection of the axle to the bearings.

The invention will appear more clearly from the following detailed description when taken in connection with the accompanying drawings showing by way of example only, preferred embodiments of the inventive idea.

In the drawings:

FIG. 9 is a top view of a car axle of the present invention.

FIG. 10 shows a portion of the axle illustrated in FIG. 9 on an enlarged scale.

FIG. 11 is a side view of the car axle looking in the direction of the arrow of FIG. 9, on an enlarged scale.

Figure 1:
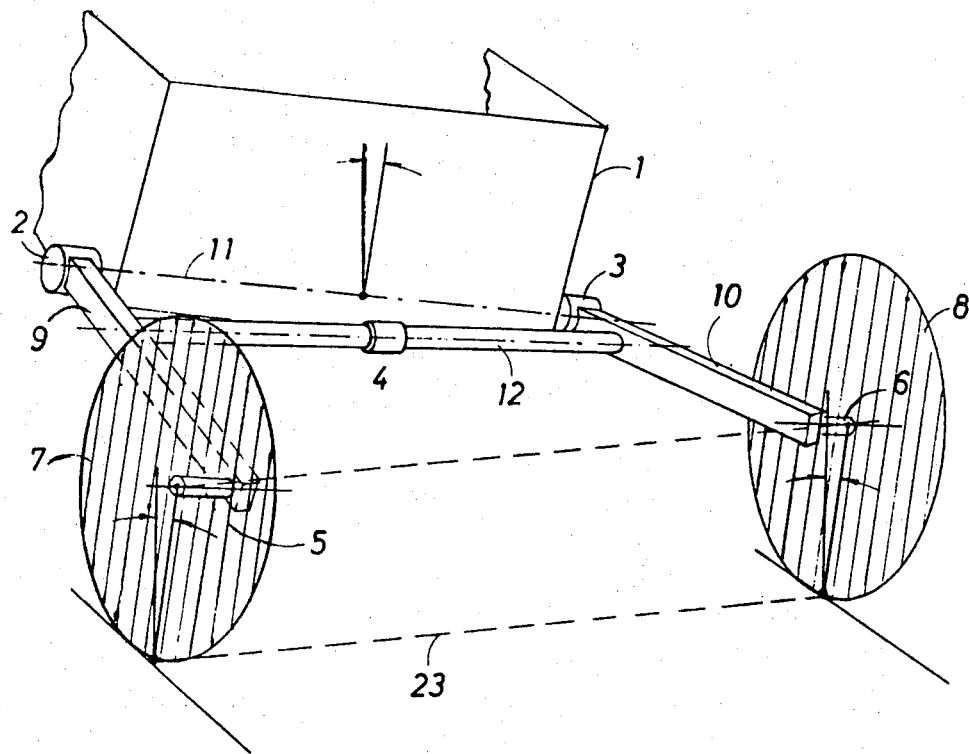
FIG. 1 is a diagrammatic perspective view of the rear axle and the car body.

FIG. 1 shows a rear axle 4 swingably mounted in bearings 2 and 3 of the car body. The axle ends 5 and 6 of the wheels 7 and 8 are fixed to rigid crank arms 9 and 10, respectively. The crank arms 9 and 10 are carried by the rubber bearings 2 and 3. Each rubber bearing is swingable about a horizontal axis 11 and an imaginary vertical axis and is resiliently yieldable to some extent in the direction of the axis 11. Furthermore, the two crank arms 9 and 10 are interconnected by a torsion axle 12 located between the axle ends 5 and 6 and their rubber bearings 2 and 2 in the car body 1.

As shown in FIG. 9 the crank arm 9 carrying the wheel 7 is connected with a large flat base 13 to the torsion axle 12.

At the end 14 of the crank arm 9 is a bracket 15 with a spring member. The crank arm 10 is similarly constructed and connected. The two ends 16 and 17 of the torsion axle 12 are bent toward the bearings 2 and 3 and the crank arms 9 and 10 are welded to the bent ends 16 and 17 of the torsion axle 12. The crank arms 9 and 10 can be made of two plates 18 and 19. As best shown in FIG. 10, the ends 16 and 17 of the torsion axle 12 can be recessed at 20 and can be fixed to the car body 1 by a substantially semicircular welding joint 21

(FIG. 11) upon the bearing rings 22 of the rubber bearings 2 and 3, respectively.

When a car 1 travels around a left hand curve it is inclined to the right (FIG. 1) against the controlling force of the torsion axle 12. Thus the right hand rubber bearing 3 is closer to the travelling path 23 than the left hand rubber bearing 2. The torsion axle 12 swings along with the car body 1. However, its swinging angle is smaller the closer it is located to the axle ends 5 and 6. Since the crank arms 9 and 10 are rigid the wheels 7 and 8 are swung to the extent of the same angle as the torsion axle 12. Thus the wheels 7 and 8 follow the inclination of the car body 1 but to a smaller extent so that, particularly if the car moves over the curve with a high speed, the inclination profile is more satisfactory and there is a better adhesion to the ground.

Figure 2:
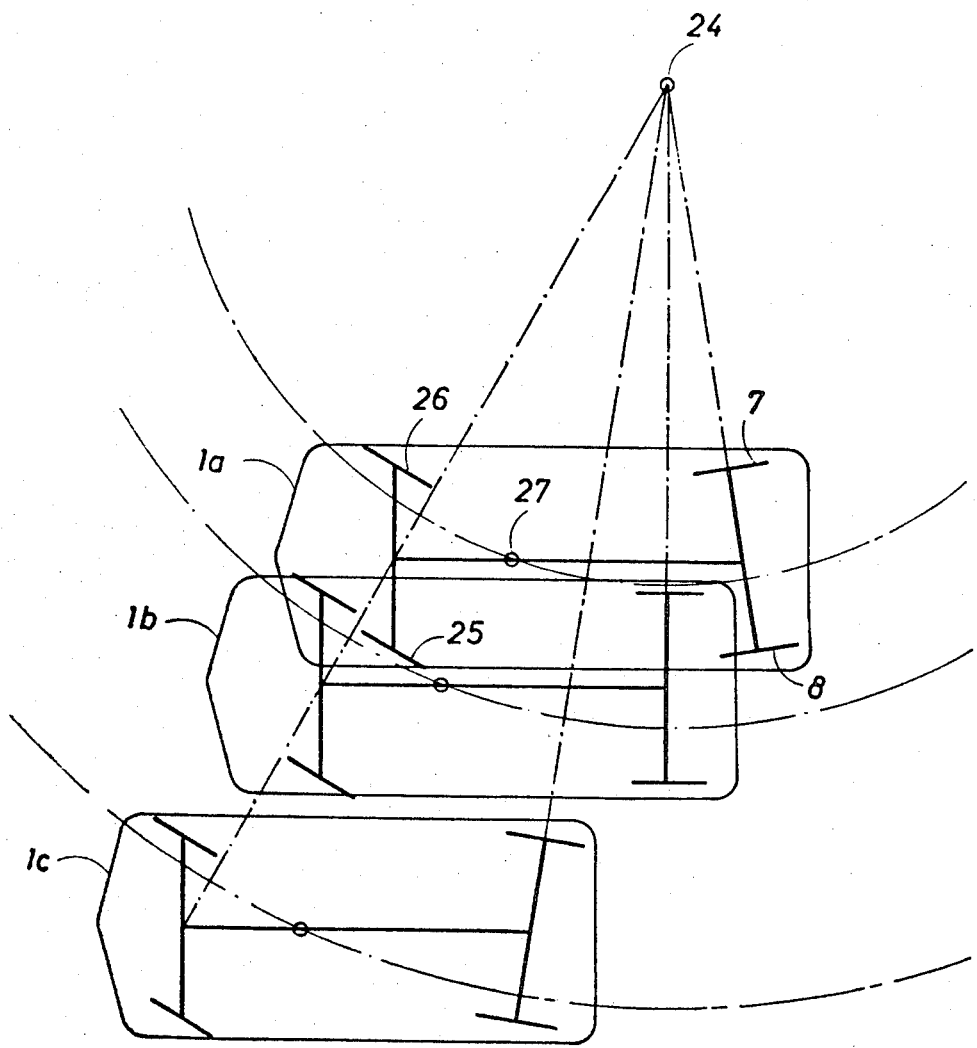
FIG. 2 is a diagram illustrating the driving of cars around a curve with differently mounted rear axles.
Figure 3:
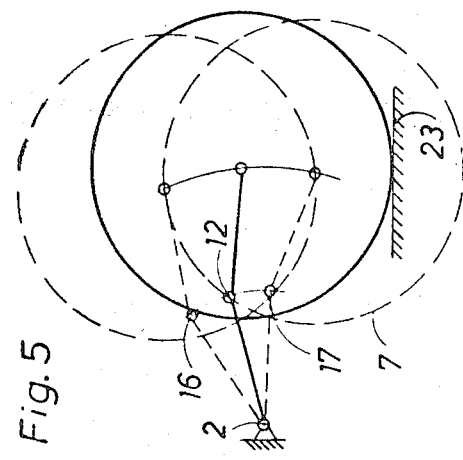
FIG. 3 illustrates diagrammatically an axle arrangement producing a low steering tendency.
Figure 6:
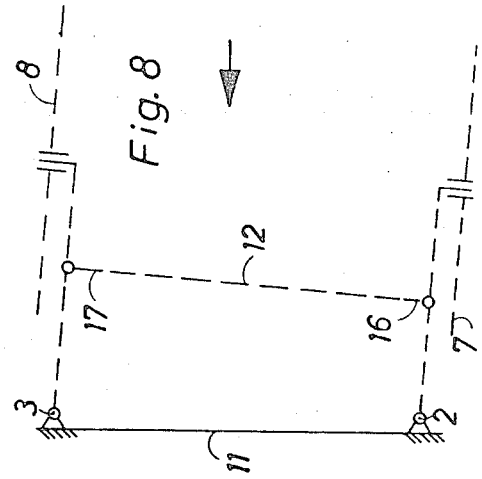
FIG. 6 is a diagram corresponding to the arrangement shown in FIG. 3.
Figure 4:
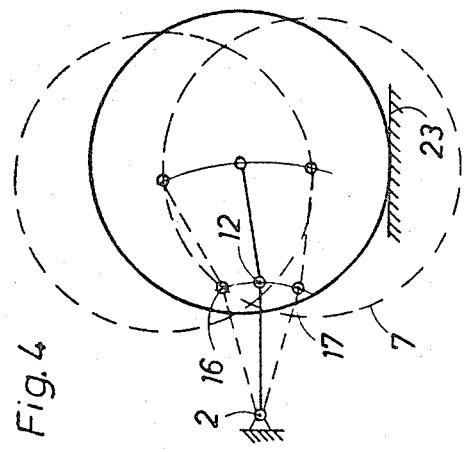
FIG. 4 illustrates diagrammatically an axle arrangement producing a neutral positioning of the car in a curve.
Figure 7:
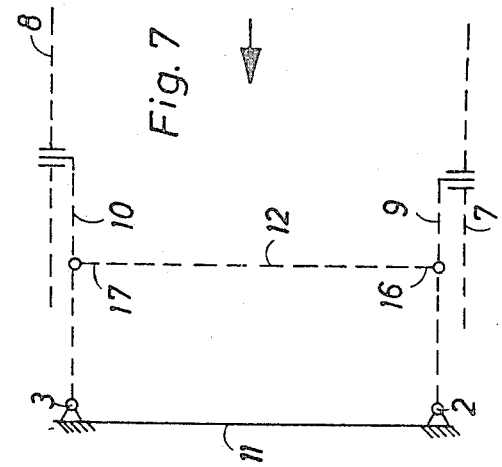
FIG. 7 is a diagram corresponding to the arrangement shown in FIG. 4.

FIGS. 3 to 8 illustrate the condition of the car affected by the rear axle depending as to whether the torsion axle 12 is located at the same height as the bearings 2 and 3, or if it is located above the bearings 2 and 3 or below the bearings 2 and 3. If, as shown in FIG. 3, the torsion axle 12 is closer to the travelling path 23 than the bearings 2, 3 during a staight car movement (the crank arm 9 being shown in full lines), then during movement along a left hand curve the end 16 of the torsion axle 12 will be raised and the end 17 will be lowered. Then the projection of the distance between the bearing 2 and the end 17 upon the travelling path 23 will be shorter than the projection of the distance between the bearing 2 and the end 16, so that the torsion axle 12 will assume the position shown by broken lines in FIG. 6. FIG. 2 shows in a simplified manner the position of wheels 7 and 8 of the car 1a in a right hand curve; they roll along circular curves having the center 24. The front wheels 25 and 26 are similarly set for that car, as well as for cars indicated as 1b and 1c in FIG. 2, the gravity centers 27 of which describe curves with larger radii about the center 24. Consequently, the wheels 7, 8 influence the action of the car 1a (FIG. 2) in a curve in the sense of an excessive steering tendency (FIG. 3 and 6) and of the car 1c (FIG. 2) in the sense of a diminished steering tendency. The arrangement shown in FIGs. 4 and 7 illustrates a neutral condition indicated by the car 1b in FIG. 2.

Figure 5:
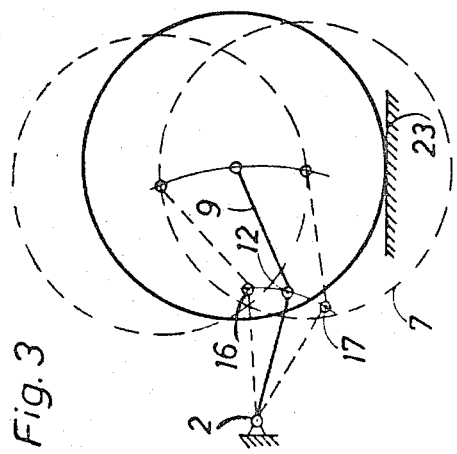
FIG. 5 illustrates diagrammatically an axle arrangement supporting an excessive steering of the car.
Figure 8:
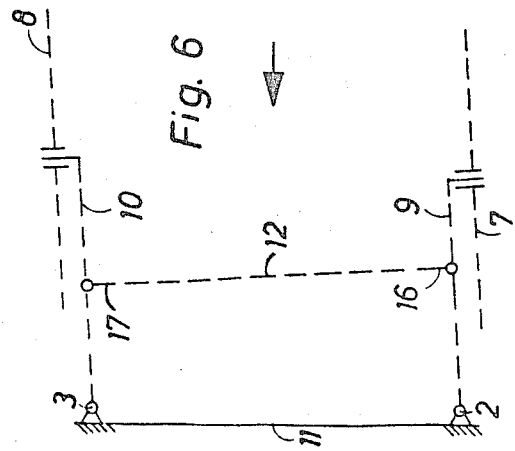
FIG. 8 is a diagram corresponding to the arrangement shown in FIG. 5.

According to FIG. 5 the torsion axle 12 is further removed from the travelling path 23 than the bearings 2, 3 during a straight movement of the car.

When the car moves sharply along a left hand curve (FIG. 1), the end 17 is lowered and the end 16 is raised and the projection of the distance between the end 16 (FIG. 5) and the bearing 2 upon the travelling path 23 is shorter than the projection of the distance between the bearing 2 and the end 17 upon the travelling path 23. Consequently, the torsion axle 12 assumes the position shown in FIG. 8 and imparts to the car 1c the diminished steering tendency illustrated in FIG. 2.

If the torsion axle 12 is located upon the same height as the bearings 2, 3 (FIG. 4), then the projections of the crank arms 9, 10 upon the travelling path 23 (FIG. 7) are equal even when the car moves along a sharp left hand curve, and the torsion axle 12 remains in top view parallel to the axis 11 through the bearings 2 and 3. The car then acts neutrally upon the curve without low or high tendencies.

When such a rear axle of the present invention is used in a motor car, the position of the torsion axle relatively to its bearings in the car body will change the motion condition of the car either by lowering the steering tendency, or by increasing it, or by having a neutral effect, while the wheels are less inclined outwardly during movement along curves than in case of other crank axles or longitudinal guide axles.

I claim:

1. In a motor car having a car body and two rear wheels with axle ends, two rigid crank arms, each of said crank arms having an end connected with a separate axis end, two bearings carried by the car body and a torsion axle having ends mounted in said bearings, said crank arms having ends connected with said torsion axle adjacent said bearings, said bearings receiving rotary, bending and axial movements.

2. A motor car rear axle according to claim 1, wherein each crank arm has a flat surface portion fixed to said torsion axle.

3. A motor car rear axle according to claim 2, wherein the first-mentioned end of each crank arm has a bracket and a spring member connected with said bracket.

4. A motor car rear axle according to claim 1, wherein said torsion axle has both ends bent toward the respective bearings, said crank arms being welded to said bent ends.

5. A motor car rear axle according to claim 1, wherein each crank arm is composed of two plates.

6. A motor car rear axle according to claim 4, wherein said ends of the crank arms are recessed, said bearings having bearing rings and semicircular welding joints connecting said bearing rings with said ends of the crank arms.

7. A motor car rear axle according to claim 1, wherein said bearings are located at a shorter distance from the travelling path of the car than said torsion axle.

* * * * *